(12) United States Patent
Sperrle et al.

(10) Patent No.: US 11,643,016 B2
(45) Date of Patent: May 9, 2023

(54) REARVIEW CAMERA FIELD OF VIEW WITH ALTERNATIVE TAILGATE POSITIONS

(71) Applicant: Robert Bosch GmbH, Stuttgart (DE)

(72) Inventors: Christian Sperrle, Ann Arbor, MI (US); Michael R. Meier, Walled Lake, MI (US); Elizabeth Kao, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/580,123

(22) Filed: Jan. 20, 2022

(65) Prior Publication Data

US 2022/0227296 A1   Jul. 21, 2022

Related U.S. Application Data (60) Provisional application No. 63/139,641, filed on Jan. 20, 2021.

(51) Int. Cl.
| | |
|---|---|
| *B60R 1/26* | (2022.01) |
| *B60R 11/04* | (2006.01) |
| *B60R 1/28* | (2022.01) |
| *G06V 20/56* | (2022.01) |
| *G06T 3/40* | (2006.01) |

(52) U.S. Cl.
CPC ............... *B60R 1/26* (2022.01); *B60R 1/28* (2022.01); *B60R 11/04* (2013.01); *G06T 3/4038* (2013.01); *G06V 20/56* (2022.01); *B60R 2300/105* (2013.01); *B60R 2300/8066* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,288,446 B2 | 3/2016 | Mokashi et al. | |
| 10,053,010 B2 | 8/2018 | Thompson et al. | |
| 10,214,156 B2 | 2/2019 | Moenig et al. | |
| 10,607,092 B2 | 3/2020 | Murad et al. | |
| 10,621,445 B2 | 4/2020 | Higgins | |
| 2018/0220081 A1* | 8/2018 | Lewis | G06V 20/56 |
| 2018/0220082 A1* | 8/2018 | Lewis | B60R 1/12 |
| 2019/0299878 A1 | 10/2019 | Nishio et al. | |
| 2022/0212603 A1* | 7/2022 | Castro | B60R 1/00 |

* cited by examiner

*Primary Examiner* — Rebecca A Volentine
(74) *Attorney, Agent, or Firm* — Michael Best & Friedrich LLP (57) ABSTRACT

Systems and methods for a rear-viewing camera system for a vehicle. A first camera is mounted on the vehicle with a field of view that is at least partially obstructed by a tailgate of the vehicle and/or a load carried by the vehicle. A second camera is mounted on the vehicle with a field of view that includes an unobstructed view of an imaging area that is obstructed in the field of view of the first camera. A tailgate position sensor is configured to output a signal indicative of a current position of the tailgate of the vehicle. By determining a position of the tailgate, an electronic controller is configured to generate an output image in which the tailgate and/or the load appear at least partially transparent by replacing image data that is obstructed in the image captured by the first camera with image data captured by the second camera.

18 Claims, 10 Drawing Sheets

REARVIEW CAMERA FIELD OF VIEW WITH ALTERNATIVE TAILGATE POSITIONS

RELATED APPLICATIONS

This application claims the priority benefit of U.S. Provisional Patent Application No. 63/139,641, filed Jan. 20, 2021, entitled "REARVIEW CAMERA FIELD OF VIEW WITH ALTERNATIVE TAILGATE POSITIONS," the entire contents of which is incorporated herein by reference.

BACKGROUND

The present invention relates to systems and methods for rear-view camera systems for a vehicle.

SUMMARY

In various implementations, systems and methods described herein provide camera systems with multiple cameras positioned with at least partially overlapping fields of view. In some implementations, the camera system includes a first camera mounted on a tailgate of a pick-up truck such that the field of view of the first camera relative to the vehicle changes from a first field of view when the tailgate is closed to a second field of view when the tailgate is opened. The system also includes a second camera mounted on the pickup truck with a rearward-facing field of view. For example, in some implementations, the second camera is mounted on a cabin of the pickup truck and the tailgate of the pickup truck partially obstructs the field of view of the second camera when the tailgate is closed. The system also includes a tailgate position sensor. An electronic controller determines a position of the tailgate sensor based on the output of the tailgate position sensor and identifies a portion of the field of view of the second camera that is obstructed by the tailgate based on the determined position of the tailgate. The electronic controller is further configured to fuse image data from the first camera and image data from the second camera to produce an output image by replacing the portion of the image data from the second camera that is obstructed by the tailgate with corresponding image data from the first camera causing the tailgate to appear at least partially transparent in the output image. In some implementations, the system is further configured to display the output image on a user display positioned within the cabin of the pickup truck (e.g., in response to determining that the pickup truck is being operated in reverse).

In some implementations, the tailgate sensor is a device or combination of devices configured to determine whether the tailgate is in a closed/"up" position or an open/"down" position. In some implementations, the tailgate sensor may include a contact sensor, a proximity sensor, and/or a camera (e.g., the second camera mounted on the pickup truck with the field of view that is partially obstructed by the tailgate).

In some implementations, the second field of view of the first camera partially includes a portion of the field of view of the second camera that is obstructed by a bottom surface of a bed of the pickup truck and, in response to determining that the tailgate is in the opened position, the electronic controller is configured to fuse the image data from the first camera and the image data from the second camera to cause at least a portion of the bottom surface of the bed of the pickup truck to appear at least partially transparent in the output image.

In some implementations, the camera system further includes a third camera mounted on a side mirror of the vehicle with a field of view that includes a portion of the field of view of the second camera that is obstructed by a first side wall of the pickup truck bed. The electronic controller is configured to generate the output image by fusing image data from the second camera and the third camera to cause at least a portion of the first side wall of the pickup truck bed to appear at least partially transparent in the output image. In some implementations, the camera system also includes a fourth camera mounted on a second side mirror of the vehicle opposite the third camera and the electronic controller is configured to generate the output image by fusing image data from the second camera and the fourth camera to cause at least a portion of a second side wall of the pickup truck bed to appear at least partially transparent in the output image.

In some implementations, the camera system is further configured to determine when the field of view of the second camera is partially obstructed by a load in the bed of the pickup truck and to fuse image data to plurality of cameras to cause the load to appear at least partially transparent in the output image. In some implementations, the electronic controller is configured to cause the load to appear transparent by replacing at least a portion of the image data from the second camera that is obstructed by the load with corresponding image data from another camera of the camera system that is not obstructed by the load. For example, in some implementations, when the electronic controlled determines, based on the output of the tailgate position sensor, that the tailgate is in a closed position and determines, based on an output of a load sensor, that a load is positioned within the bed of the pickup truck, the electronic controller replaces the portion of the image data from the second camera that is obstructed by the load with corresponding image data from the first camera.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
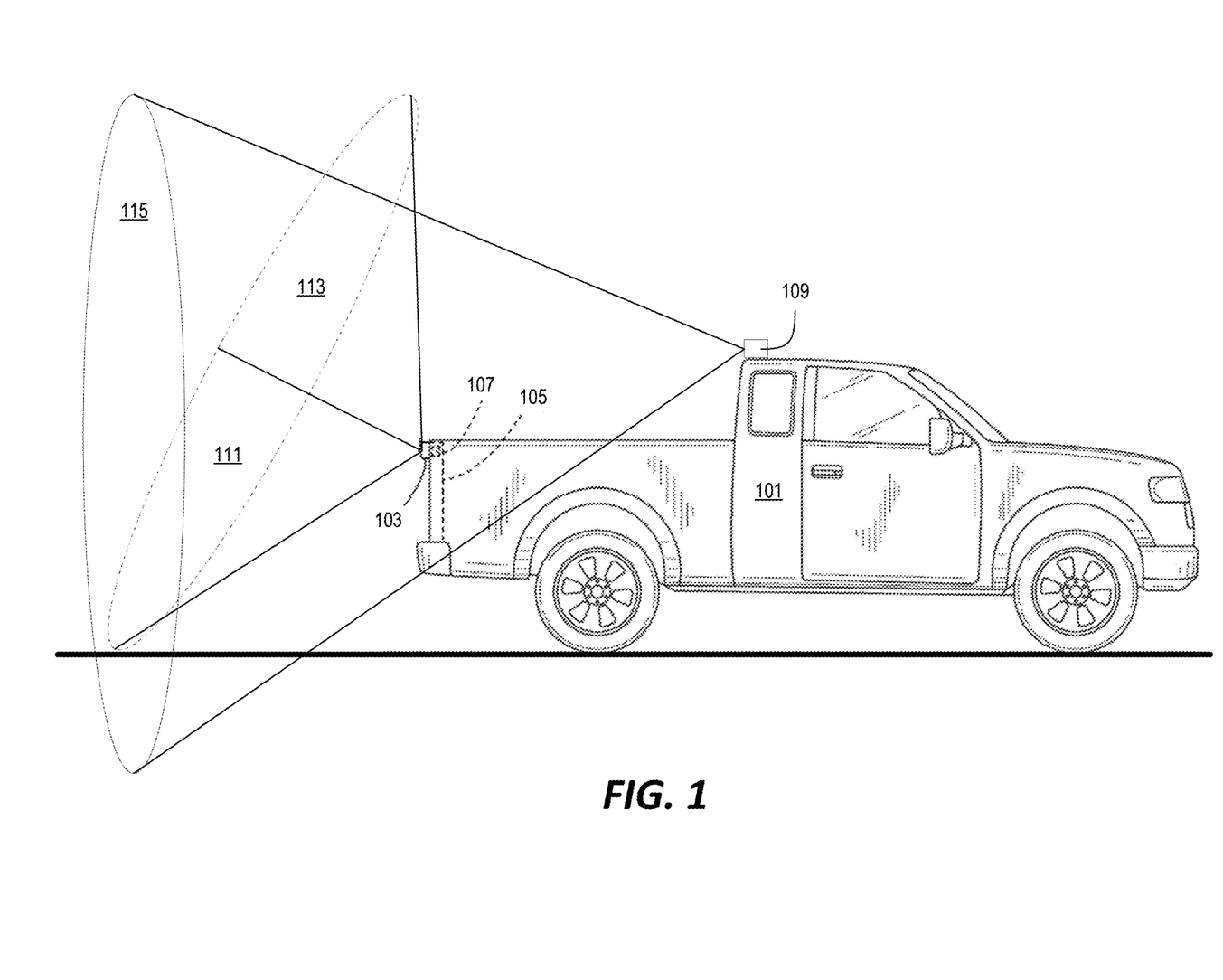
FIG. 1 is an elevation view of a pickup truck equipped with a rearward-facing camera system according to one embodiment and the fields of view of the cameras in the camera system when the tailgate of the pickup truck is in a closed position.
Figure 2:
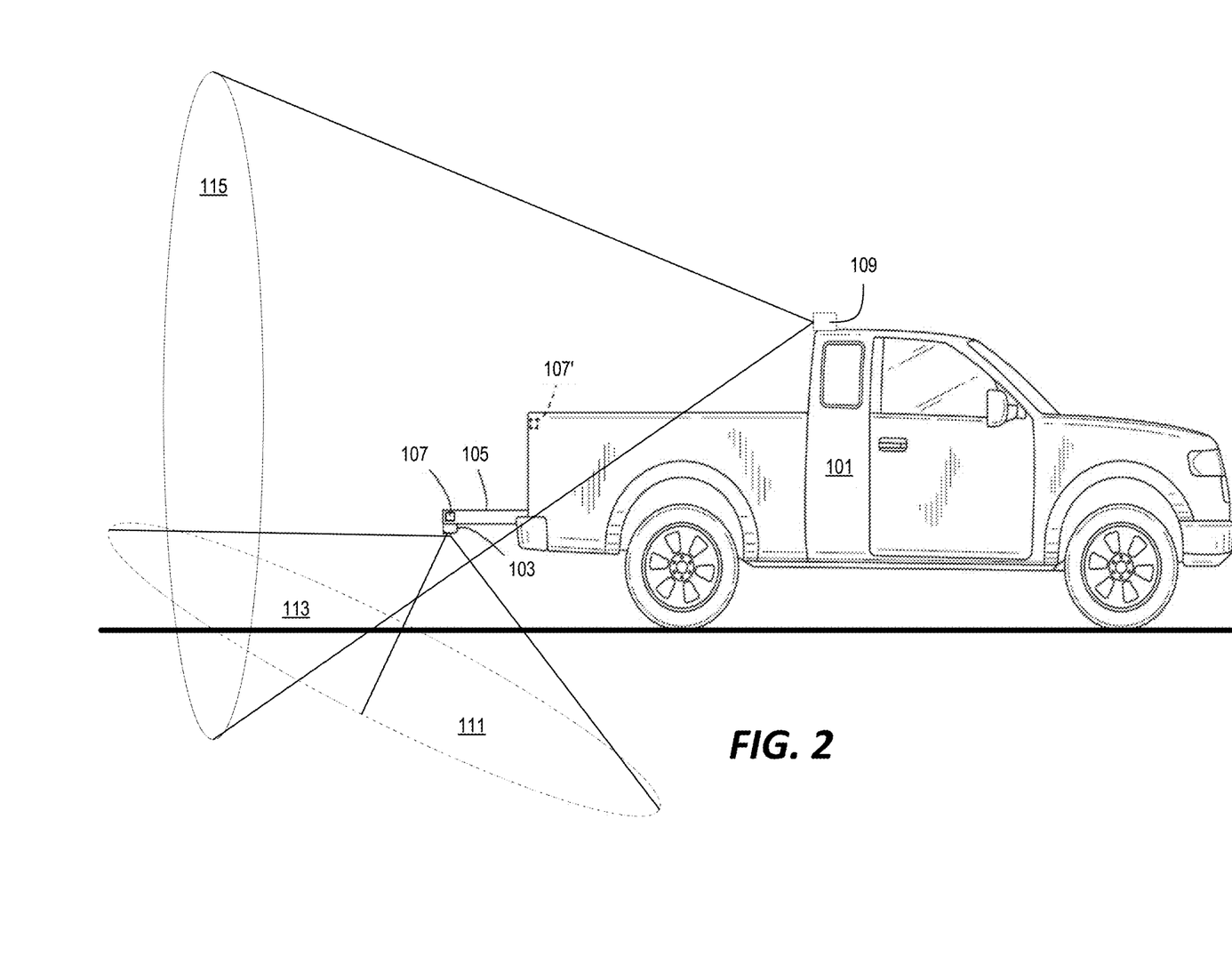
FIG. 2 is an elevation view of the pickup truck of FIG. 1 and the fields of view of the cameras when the tailgate of the pickup truck is in an open position.

FIGS. 1 and 2 illustrate an example of a pickup truck 101 equipped with a rearward-facing camera system. The camera system in the example of FIG. 1 includes a first camera 103 (referred to herein as a "tailgate camera") mounted on a rear-lift door (i.e., a tailgate 105) of the pickup truck 101, a tailgate position sensor 107, and a second camera 109 (referred to herein as a "cabin camera") mounted on the cabin of the pickup truck.

The tailgate position sensor 107 is configured to detect a position of the tailgate 105 and to output a signal indicative of the current position of the tailgate 105. In the example of FIGS. 1 and 2, the tailgate position sensor 107 is mounted to the tailgate 105 and a corresponding second sensor component 107' is mounted to a sidewall of the pickup truck. The second sensor component is positioned such that, when the tailgate 105 is in the closed positioned (as illustrated in FIG. 1), the tailgate position sensor 107 & the second sensor component 107' are closely positioned relative to each other and, conversely, when the tailgate 105 is in the open position (as illustrated in FIG. 2), the tailgate position sensor 107 is moved away from the second sensor component 107'. Accordingly, the tailgate position sensor 107 is configured to detect whether the second sensor component 107' is positioned within a detectable distance from the tailgate position sensor 107, to generate a first output signal in response to determining that the second sensor component 107' is positioned within the detectable distance, and to generate a different second output signal in response to determining that the second sensor component 107' is not positioned within the detectable distance. Accordingly, in this example, the tailgate position sensor 107 may include, for example, a contact sensor or a proximity sensor.

In various different implementations, the tailgate position sensor may be mounted on the tailgate 105, the sidewall of the pickup truck bed, or both. In some implementations, the tailgate position sensor 107 may include a latch sensor configured to detect when a tailgate latching mechanism is engaged (e.g., coupling the tailgate 105 to the side wall of the pickup truck in the closed position). Furthermore, in some implementations, the tailgate position sensor 107 may be configured to utilize other types of sensors including, for example, non-contact sensing technologies such as radar or lidar. Alternatively, in some implementations, a camera (e.g., the cabin camera 109) may be configured to provide the functionality of the tailgate position sensor 107 by capturing image data including all or part of the tailgate 105 and then applying image processing techniques to determine a position of the tailgate 105 based on the captured image data.

As illustrated in FIGS. 1 and 2, because the tailgate camera 103 is mounted on the tailgate 105 of the pickup truck 101, the field of view of the tailgate camera 103 changes when the position of the tailgate 105 is altered. As shown in FIG. 1, when the tailgate 105 is in the closed position, the field of view of the tailgate camera 103 (i.e., the first field of view) includes a lower field of view 111 including an area directly behind the tailgate 105 and an upper field of view 113 including an area above the tailgate 105. As shown in FIG. 2, when the tailgate 105 is in the open position, the field of view of the tailgate camera 103 (i.e., the second field of view) is similarly altered such that the upper field of view 113 generally includes an area behind the pickup truck 101 while the lower field of view 111 is generally downward facing and includes an area below the tailgate 105.

As illustrated in FIGS. 1 and 2, because the cabin camera 109 is mounted to a fixed location on the pickup truck 101, the field of view 115 of the cabin camera 109 remains stationary regardless of the position of the tailgate 105. The field of view 115 of the cabin camera 109 in this example extends behind the cabin of the pickup truck 101 and includes at least a portion of the interior of the bed of the pickup truck 101 and an area behind the pickup truck 101. The field of view 115 of the cabin camera 109 at least partially overlaps with the field of view 111, 113 of the tailgate camera 103 and, as illustrated in the example of FIGS. 1 and 2, the field of view of the cabin camera 109 is at least partially obstructed by the tailgate 105 when the tailgate 105 is in the open position (FIG. 2) and when the tailgate 105 is in the closed position (FIG. 1)—although, the extent to which the field of view 115 is obstructed is decreased when the tailgate 105 is in the open position.

Figure 3:
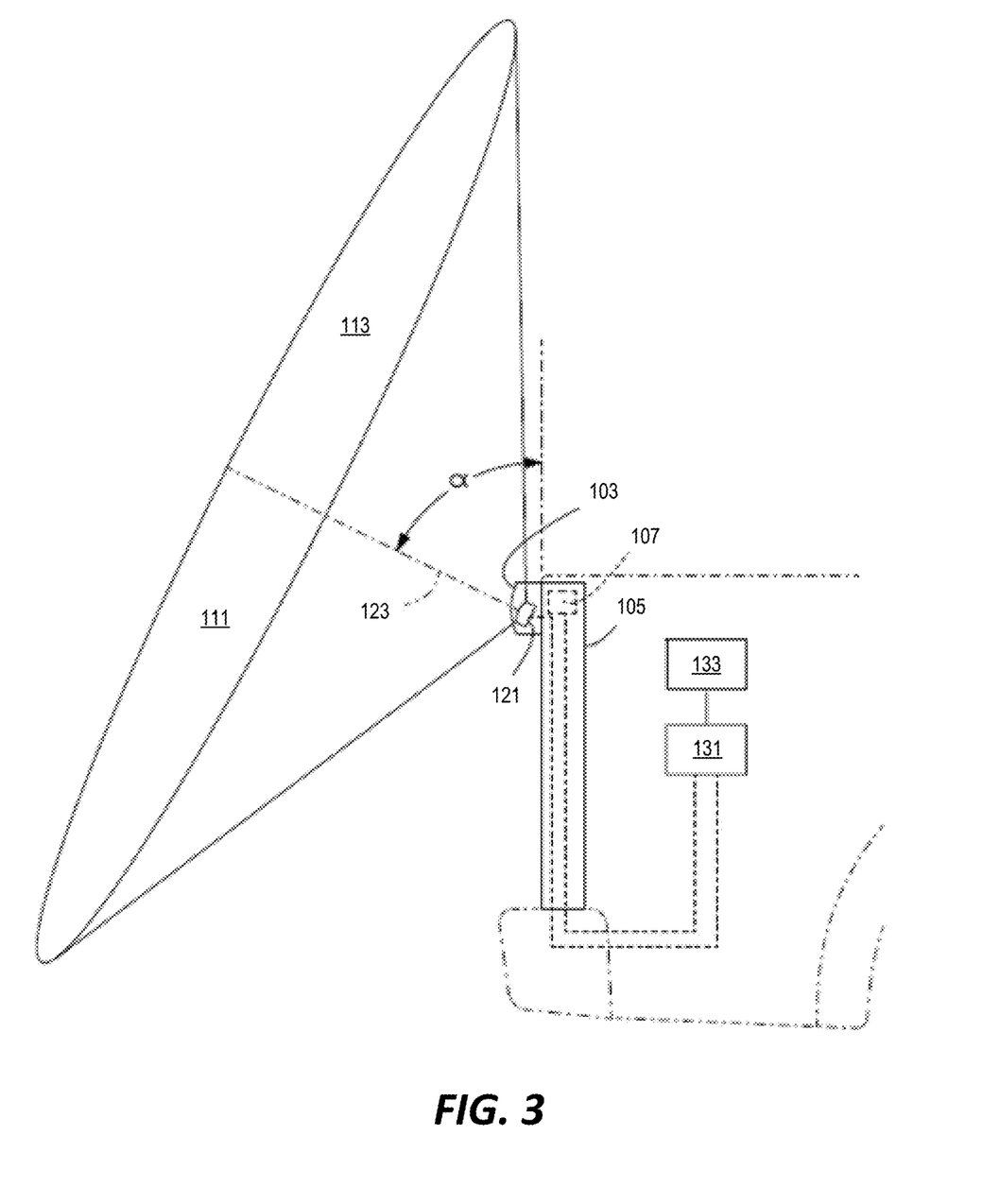
FIG. 3 is a partially transparent schematic view of the tailgate and components of the system mounted thereon in the example of FIG. 1.
Figure 4A:
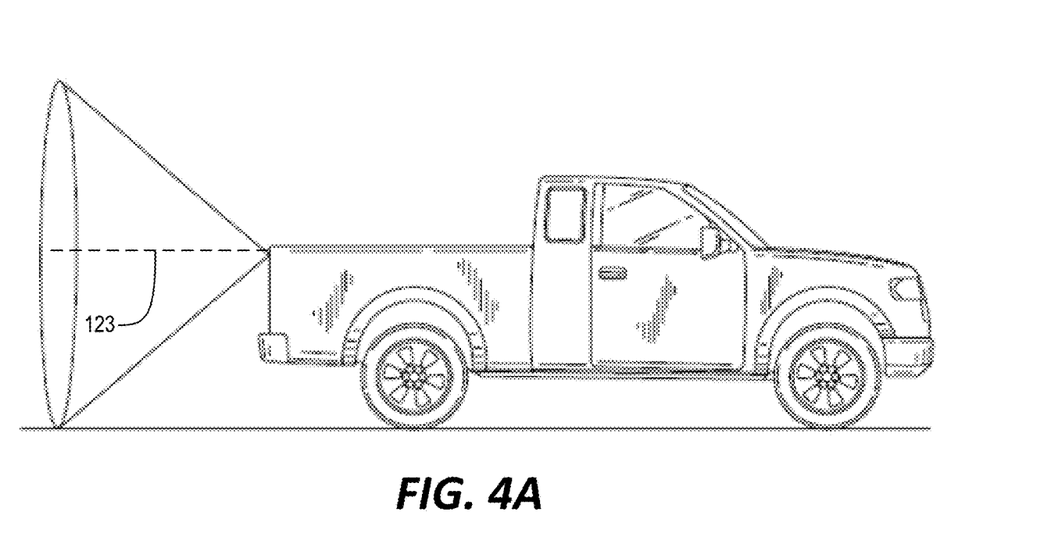
FIG. 4A is an elevation view of the pickup truck of FIG. 1 with an alternative configuration of a tailgate camera and the field of view of the tailgate camera when the tailgate is in the closed position.
Figure 4B:
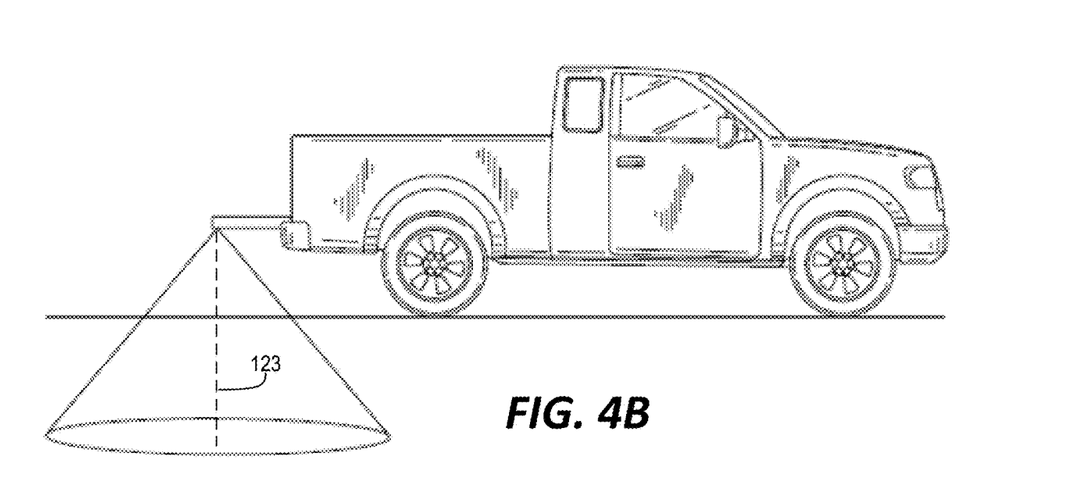
FIG. 4B is an elevation view of the pickup truck of FIG. 1 with the alternative configuration of the tailgate camera of FIG. 4A and the field of view of the tailgate camera when the tailgate is in the open position.

In the example of FIGS. 1 and 2 (and as illustrated in further detail in FIG. 3), the tailgate camera 103 includes an image sensing component 121 (e.g., a CCD array) positioned with a central imaging axis 123 oriented at an oblique angle α (e.g., 45°) relative to the outer surface of the tailgate 105. In other implementations, the orientation angle of the central imaging axis 123 may be configured differently. For example, FIGS. 4A and 4B illustrates an implementation in which the central imaging axis 123 of the tailgate camera 103 is oriented at 90° relative to the outer surface of the tailgate 105. Accordingly, when the tailgate 105 is in the closed position, the field of view of the tailgate camera 103 (i.e., the first field of view) includes an area directly behind the tailgate 105 (as shown in FIG. 4A) and, when the tailgate 105 is in the open position, the field of view of the tailgate camera 103 (i.e., the second field of view) include an area directly below the open tailgate 105 (as shown in FIG. 4B).

Returning to FIG. 3, in some implementations, the tailgate camera 103 (and/or other cameras in the camera system) may include a fish-eye or other type of wide-angle lens to obtain image data from a large field of view in the vertical direction. In some such implementations, the field of view of the camera is approximately 120° (e.g., a conical imaging field extending 60° relative to the central axis 123.

Image data captured by the tailgate camera 103 and other cameras (not shown in FIG. 3) is transmitted (e.g., through a wired or wireless communication mechanism) to an electronic controller 131. The electronic controller 131 is configured to process the captured image data from the multiple different cameras and to produce a single output image (as discussed in further detail below) that is then transmitted to and displayed on a display screen 133. In some implementations, the display screen 133 is positioned within the cabin of the pickup truck 101 and is viewable by the driver of the pickup truck 101. In some implementations, the electronic controller 131 is configured to display the rearward facing output image on the display screen 133 in response to determining that the pickup truck is being operated in reverse. Alternatively or additionally, in some implementations, the electronic controller 131 is configured to display the rearward facing output image on the display screen 133 in response to a user input received through a dashboard-mounted instrument of the pickup truck 101 (e.g., through a touch-screen display screen 133).

Figure 5:
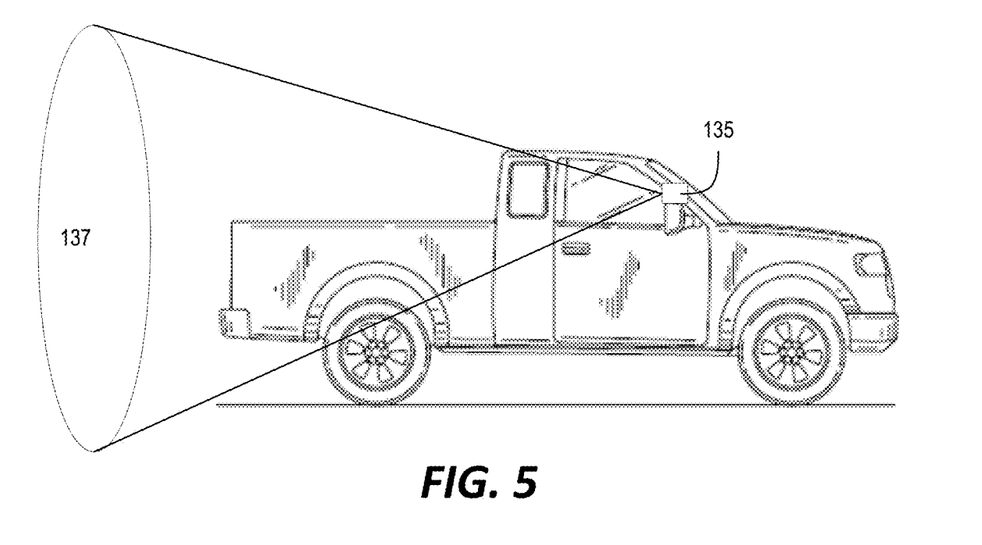
FIG. 5 is an elevation view of the pickup truck of FIG. 1 configured to include a side mirror camera and showing the field of view of the side mirror camera.

In some implementations, the camera system of the pickup truck 101 may include other cameras mounted in other positions in addition to or instead of the tailgate camera 103 and/or the cabin camera 109. For example, FIG. 5 illustrates a configuration where a side mirror camera 135 is mounted on the passenger-side rearview mirror of the pickup truck 101 with a rearward facing field of view 137. In some implementations, the camera system of the pickup truck 101 includes the tailgate camera 103, and one or more side mirror cameras 135. For example, the system may include a side mirror camera 135 mounted to the passenger side rear view mirror as illustrated in FIG. 5 and also another side mirror camera 135 mounted to the driver side rear view mirror on the opposite side of the pickup truck 101.

Figure 6:
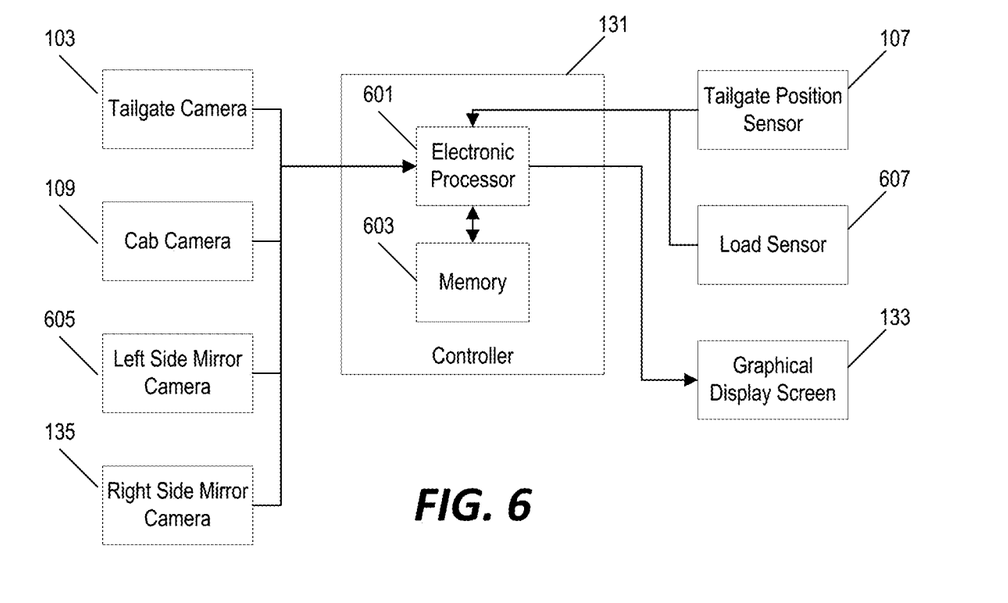
FIG. 6 is a block diagram of a control system for the camera system illustrated in the examples of FIGS. 1 through 5.

FIG. 6 illustrates an example of a control system for the camera system of the pickup truck 101 illustrated in FIGS. 1 through 5. The system includes the electronic controller 131 which includes an electronic processor 601 and a non-transitory computer-readable memory 603. The memory 603 stores data and computer-executable instructions that are accessed and executed by the electronic processor 601 to provide the functionality of the controller 131 including, for example, the functionality described herein. The controller 131 is communicatively coupled (e.g., by wired or wireless communication mechanism) to and receives captured image data from the tailgate camera 103, the cabin camera 109, the right side mirror camera 135, and a left side mirror camera 605. As noted above and as described in further detail below, the electronic processor 131 is configured to receive the image data captured by one or more cameras and to generate an output image, which is then transmitted to and displayed on a graphical display screen 133 (e.g., a user display screen 133 in the cabin of the pickup truck 101).

The controller 131 is also communicatively coupled to various other sensors. For example, based on the output received from the tailgate position sensor 107, the electronic controller 131 is configured to determine whether the tailgate 105 is currently in an open position (as shown in FIG. 2) or a closed position (as shown in FIG. 1). Additionally, in some implementations, the controller 131 is also communicatively coupled to a load sensor 607 configured to determine whether a load is currently positioned within the bed of the pickup truck 101 that might obstruct the field of view 115 of the cabin camera 109. In some implementations, the load sensor 607 is configured to sense a weight of the bed of the pickup truck and to generate an output signal indicative of the sensed weight (e.g., an output signal indicative of the measured weight of the contents of the bed or a binary signal indicating when the weight measured by the load sensor exceeds a threshold). However, in other implementations, the electronic controller 131 may be configured to accomplish the functionality of the load sensor 607 with other sensing mechanism. For example, instead of measuring a weight of the bed of the pickup truck (and any contents thereof), the system may instead be configured to include lidar, radar, or image processing technologies to detect the presence of objects in the bed of the pickup truck and to determine what, if any, portion of the field of view 115 of the cabin camera 109 might be obstructed by the contents of the bed of the pickup truck.

As described in the examples above, the cabin camera 109 has a rearward-facing field of view 115. Rearward-facing image data, such as the image data captured by the cabin camera 109, might be displayed to the operator of the pickup truck 101, for example, to assist the driver when operating the pickup truck 101 in reverse. However, the field of view 115 of the cabin camera 109 is partially obstructed by other parts of the pickup truck 101 includes, for example, the tailgate 105, the bottom surface of the bed of the pickup truck, and the sidewalls of the bed of the pickup truck. This field of view 115 might also be further obstructed by objects positioned within the bed of the pickup truck 101. However, the other cameras 103, 135, 605 are positioned with fields of view that at least partially overlap with the field of view 115 of the cabin camera 109 in obstructed portions of the field of view 115 of the cabin camera 109. Accordingly, as described in further detail in the examples below, the electronic controller 115 is configured to generate an output image by replacing portions of the image data from the cabin camera 109 that is determined to be obstructed with corresponding unobstructed image data from one of the other cameras mounted on the pickup truck 101. For example, image data that is obstructed by the tailgate 105 is replaced with corresponding image data captured by the tailgate camera 103—in this manner, the tailgate 105 of the pickup truck 101 may appear as though it were transparent in the output image generated by the electronic controller 131 and displayed on the graphical display screen 133. Similarly, in some implementations, for example, image data that is obstructed by the sidewalls of the bed of the pickup truck may be replaced with corresponding image data captured by the side mirror cameras 135, 605; image data that is obstructed by the bottom surface of the bed of the pickup truck 101 may be replaced with corresponding image data captured by the tailgate camera 103 and/or the side mirror cameras 135, 605; and image data that is obstructed by one or more objects within the bed of the pickup truck may be replaced with corresponding image data captured by the tailgate camera 103 and/or the side mirror cameras 135, 605.

Figure 7:
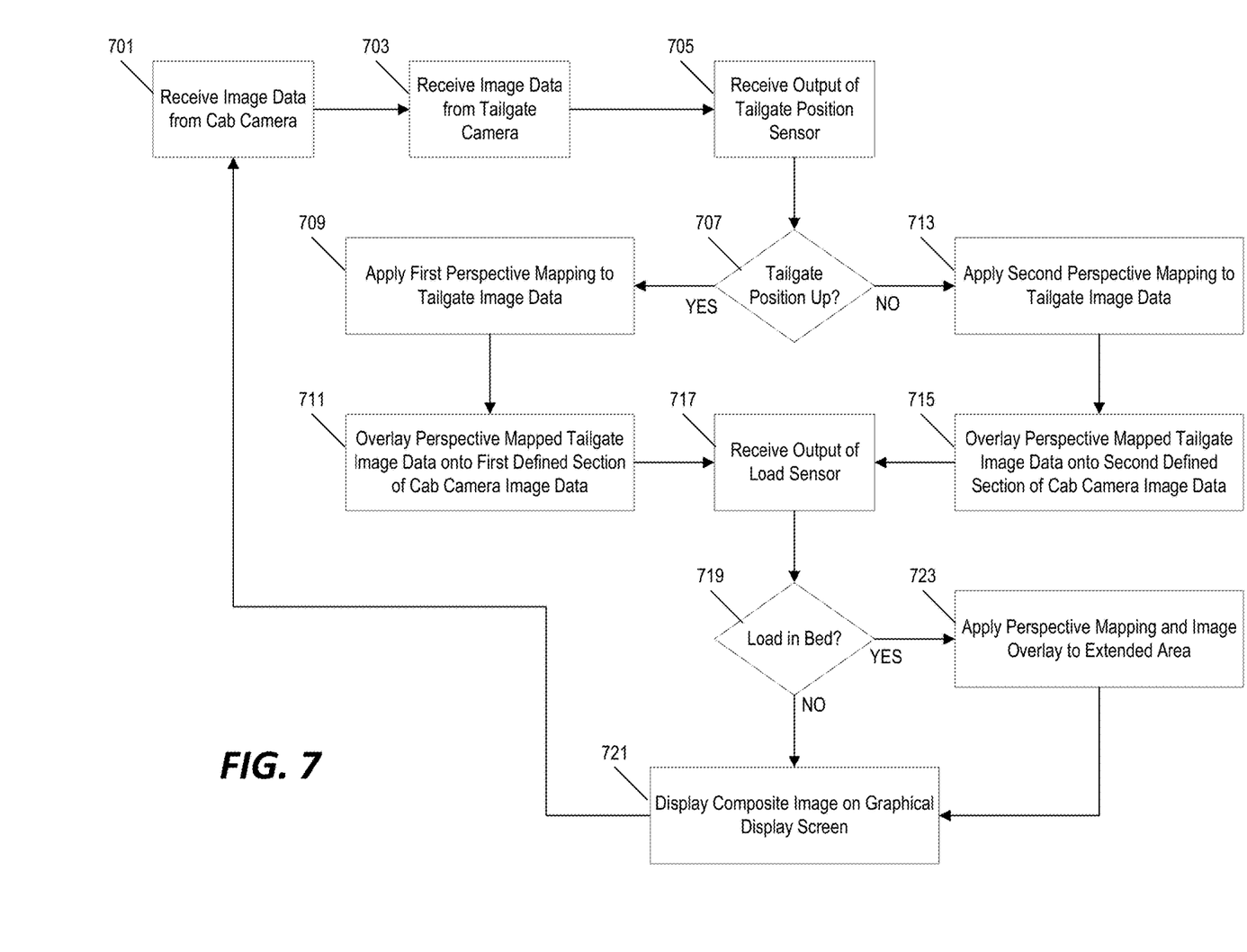
FIG. 7 is a flowchart of a method of operating the camera system using the control system of FIG. 6 to produce an output image.

FIG. 7 illustrates one example of a method for generating an output image by fusing data from multiple different cameras to remove obstructions in the field of view of the cabin camera 109 and to replace the obstructed image data with unobstructed image data captured by another camera. The electronic controller 131 receives image data from the cabin camera 109 (step 701) and receives image data from the tailgate camera 103 (step 703). The electronic controller 131 also receives the output of the tailgate position sensor 107 (step 705) and determines, based on the output of the tailgate position sensor 107, whether the tailgate 105 is currently in closed/"up" position or the open/"down" position (step 707).

The orientation of the tailgate camera 103 relative to the cabin camera 109 is known based on the determined position of the tailgate 105. Accordingly, once the position of the tailgate is determined, perspective mapping techniques can be used to identify a group of pixels in the image data captured by the tailgate camera 103 that correspond to the portion of the image data captured by the cabin camera 109 that is obstructed by the tailgate and to map the pixels from the image data captured by the tailgate camera 103 to the image data captured by the cabin camera 109 to correct for the difference in perspective between the two cameras.

Therefore, when the electronic controller 131 determines that the tailgate is in the closed/"up" position (step 707), a first perspective mapping is applied to the tailgate image data (i.e., the image data captured by the tailgate camera 103) (step 709) and the perspective mapped tailgate image data is overlaid onto a first defined section of the cabin camera image data (i.e., the portion of the image data captured by the cabin camera 109 that is obstructed by the closed tailgate 105) (step 711). Conversely, when the electronic controller 131 determines that the tailgate is in the open/"down" position (step 707), a different second perspective mapping is applied to the tailgate image data (step 713) and the perspective mapped tailgate image data is overlaid onto a second defined section of the cabin camera image data (i.e., the portion of the image data captured by the cabin camera 109 that is obstructed by the open tailgate 105) (step 715).

As discussed above, in some implementations, the electronic controller 131 is further configured to determine whether the field of view 115 of the cabin camera is obstructed by one or more objects are positioned in the bed of the pickup truck. In some such implementations, the electronic controller 131 receives the output of a load sensor 607 (step 717) and, based on the received load sensor output, determines whether a load is currently positioned in the bed of the pickup truck (step 719). If a load is detected in the bed, then the perspective mapping and image data overlaying described above (in steps 709/711 and 713/715) is applied to an extended area corresponding to the load in the bed of the pickup truck (step 723). The output image generated as a composite of image data from the multiple different cameras is then displayed to the driver of the pickup truck 101 on the graphical display screen 133 (step 721).

Figure 8A:
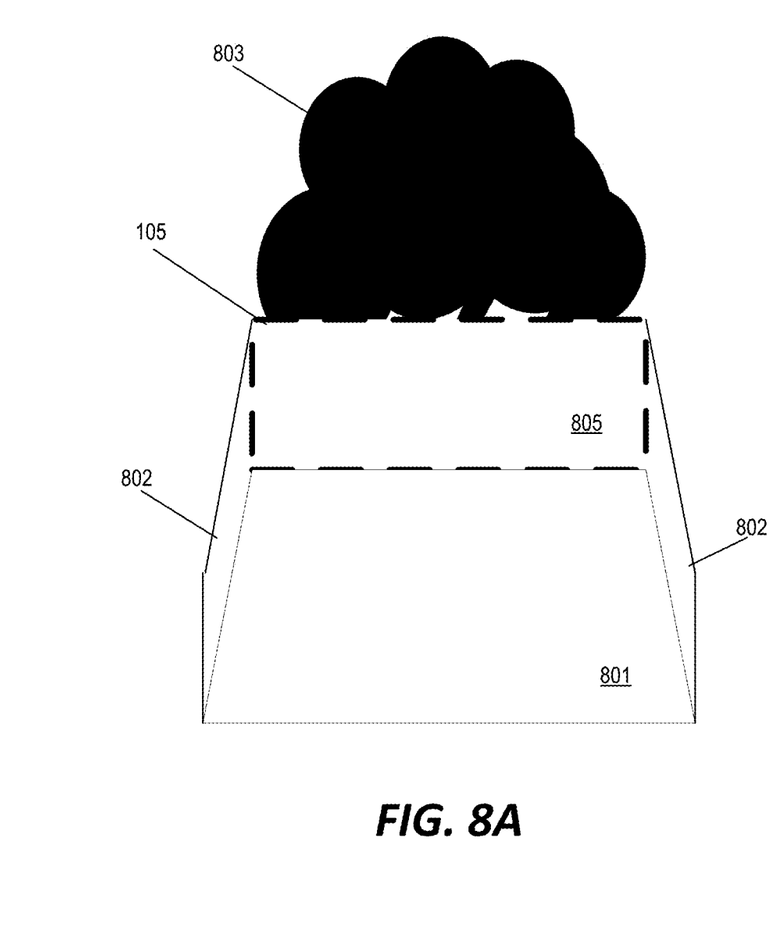
FIGS. 8A and 8B are a first example of image data captured by a rear-facing cabin-mounted camera and the output image displayed by the camera system when the tailgate of the pickup truck is in a closed position.
Figure 8B:
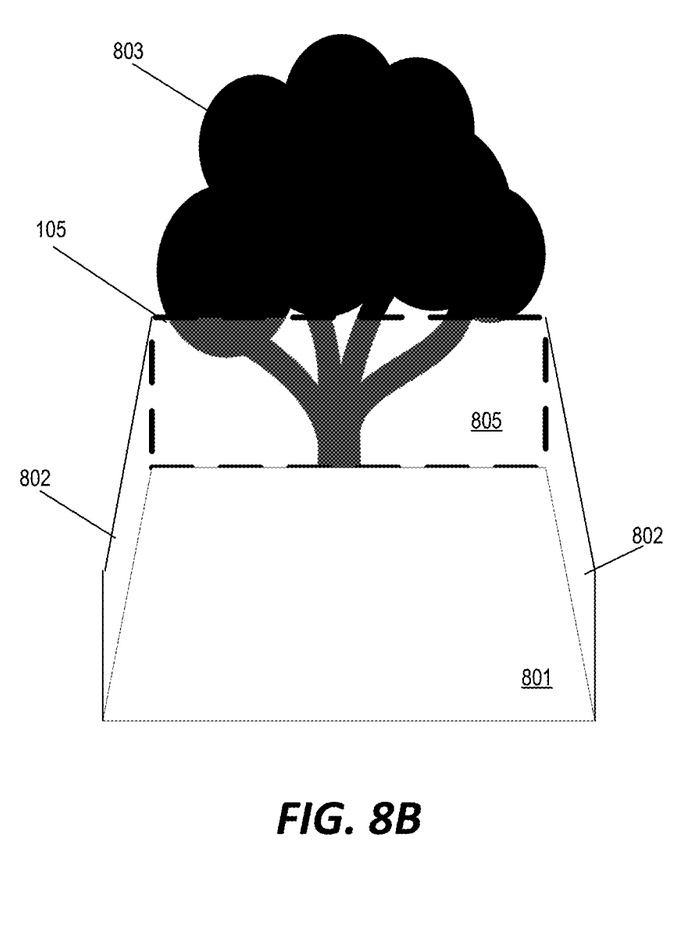

FIGS. 8A through 11B illustrate specific examples of the image mapping techniques performed by the electronic processor (such as described in FIG. 7). FIG. 8A shows a first example of an image captured by the cabin camera 109. In this example, the bottom 801 and the interior surface of the sidewalls 802 of the pickup truck bed are visible in the image data captured by the cabin camera 109. A tree 803 is located behind the pickup truck 101 and is partially obstructed by the tailgate 105 in the image data captured by the cabin camera 109. Because the system can be calibrated to know the position and size of the tailgate 105 relative to the cabin camera 109, the electronic controller 131 can be configured to know in advance what portion of the image data captured by the cabin camera 109 will be obstructed by the tailgate 105 when the tailgate 105 is in the closed/"up" position and which portion of the image data captured by the cabin camera 109 will be obstructed by the tailgate 105 when the tailgate 105 is in the open/"down" position. In the example of FIG. 8A, the electronic controller 131 determines, based on the output of the tailgate position sensor 107, that the tailgate 105 is in the closed/"up" position and, therefore, is able to determine that a predefined portion 805 of the image data captured by the cabin camera 109 is obstructed by the tailgate 105. Accordingly, the electronic controller 131 applies the perspective mapping techniques (see, e.g., step 709 in FIG. 7) and overlays image data from the tailgate camera 103 in the portion 805 of the image data captured by the cabin camera 109. As a result, in the output image generated by the controller 131, as shown in FIG. 8B, the tailgate 105 appears transparent and more of the tree 803 is visible in the output image than in the original image captured by the cabin camera 109.

Figure 9A:
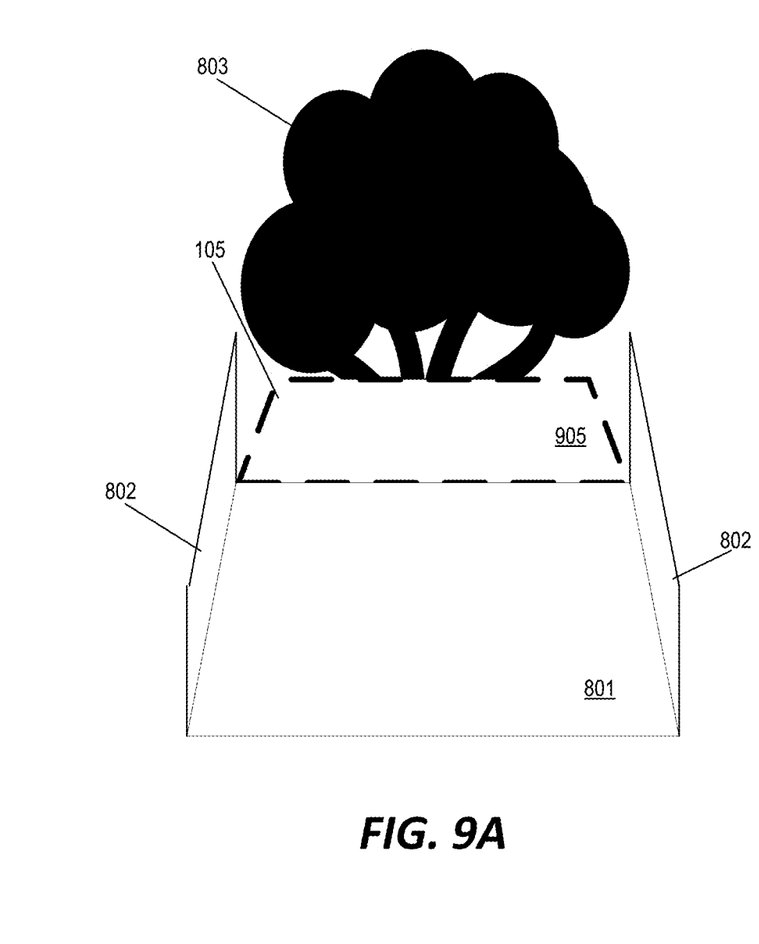
FIGS. 9A and 9B are a second example of image data captured by the rear-facing cabin-mounted camera and the output image displayed by the camera system when the tailgate of the pickup truck is in an open position.
Figure 9B:
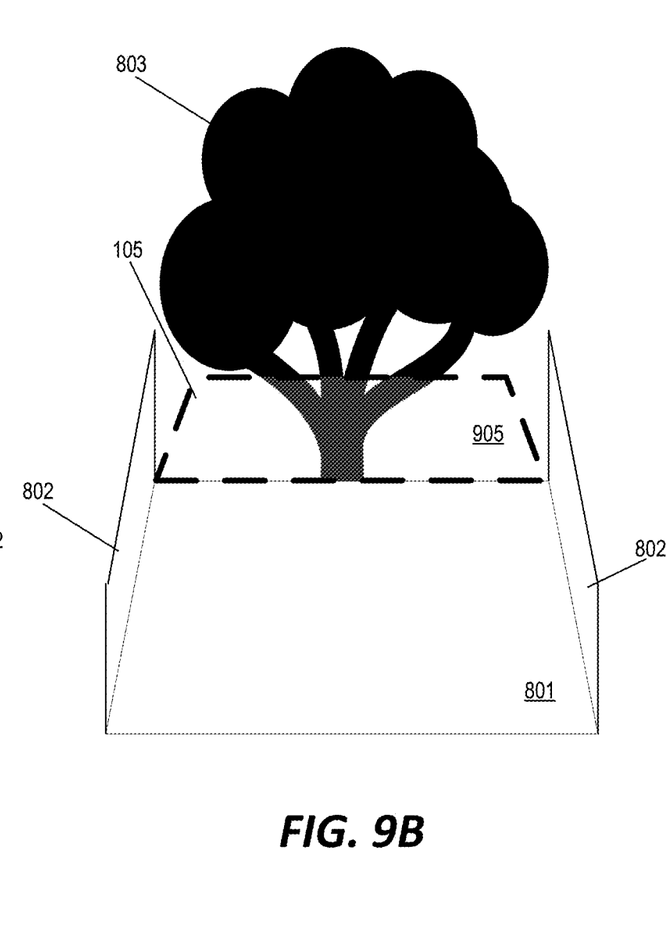

FIGS. 9A and 9B illustrate a similar example where the tailgate 805 is in the open/"down" position. As shown in FIG. 9A, although the open tailgate 105 obstructs less of the field of view of the cabin camera 109 than the closed tailgate 105 (shown in FIG. 8A), the open tailgate 105 still obstructs part of the field of view. Similar to the example described above in reference to FIGS. 8A and 8B, the electronic controller 131 is calibrated to know the position and size of the tailgate relative to the cabin camera 109 and, therefore, the electronic controller 131 can be calibrated and/or programmed to know in advance what portion of the image data captured by the cabin camera 109 will be obstructed by the tailgate 105 when the tailgate 105 is in the open/"down" position. In the example of FIG. 9A, the electronic controller 131 determines, based on the output of the tailgate position sensor 107, that the tailgate 105 is in the open/"down" position and, therefore, is able to determine that a second predefined portion 905 of the image data captured by the cabin camera 109 is obstructed by the tailgate 105. Accordingly, the electronic controller 131 applies the second perspective mapping (see, e.g., step 713) to the image data captured by the tailgate camera 103 and overlays the perspective-mapped image data from the tailgate camera 103 in the portion 905 of the image data captured by the cabin camera 109. As a result, in the output image generated by the controller 131, as shown in FIG. 9B, the tailgate 105 appears transparent and more of the tree 803 is visible in the output image than in the original image captured by the cabin capture 109.

Figure 10A:
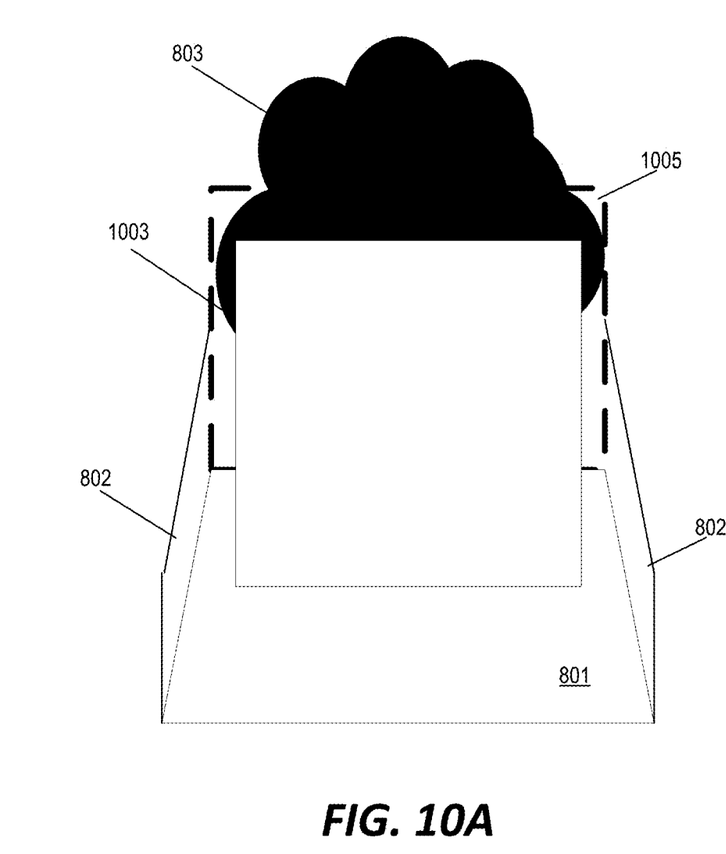
FIGS. 10A and 10B are a third example of image data captured by the rear-facing cabin-mounted camera and the output image displayed by the camera system when a load positioned within the bed of the pickup truck partially obstructs the field of view of the rear-facing cabin-mounted camera.
Figure 10B:
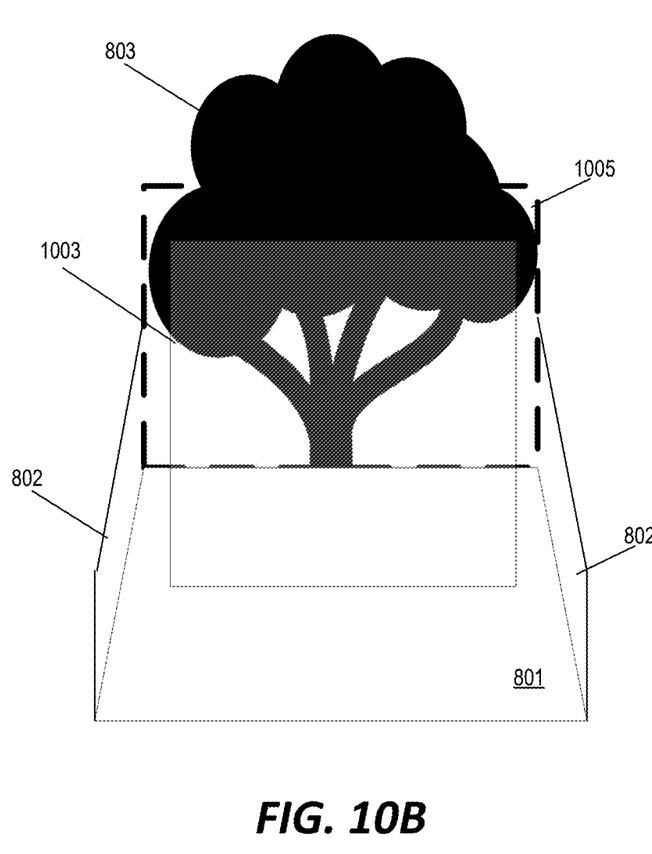

FIGS. 10A and 10B illustrate yet another example in which the field of view of the cabin camera 109 is partially obstructed by a load 1003 positioned within the bed of the pickup truck. As shown in FIG. 10A, the load 1003 obstructs even more of the field of view of the cabin camera 109 than the tailgate 105 in the examples of FIGS. 8A through 9B. Similar to the examples described above, the electronic controller 131 is configured to apply perspective mapping to unobstructed image data captured by another camera (e.g., image data captured by the tailgate camera 103) and to overlay the perspective mapped image data onto an area 1005 of the image data captured by the cabin camera 109 that is obstructed by the load 1003 so that the load 1003 appears transparent in the output image, as shown in FIG. 10B.

In some implementations, the electronic controller 131 may be configured to determine or approximate the actual size and position of the load 1003 based, for example, on data from a radar system, a lidar system, or the image data captured by the cabin camera 109 in order to dynamically determine the portion 1005 of the image data from the cabin camera 109 that is actually obstructed by the load 1003. In other implementations, the electronic controller 131 may instead be configured to use the same predefined portion 1005 regardless of the actual size/position of the load 1003.

In some situations and implementations, the image data obstructed by the load 1003 may exceed the image data that can be replaced by perspective mapping and overlays using image data captured by other cameras. For example, if the height of the load 1003 extends above the field of view of the tailgate camera 103, then image data from the tailgate camera 103 cannot be used to replace all of the image data captured by the cabin camera 109 that is obstructed by the load 1003. This may occur particularly when the tailgate 105 is in the open/"down" position as the position of the tailgate 105 will alter the field of view of the tailgate camera 103 (as illustrated above in FIGS. 1 and 2). Accordingly, in some implementations, the electronic controller 131 may be configured to apply perspective mapping and image data overlay to remove a load 1003 from the output image only when the load 1003 is detected in the bed of the pickup truck and the tailgate 105 is in the closed/"up" position. In other implementations the electronic controller 131 is instead configured to replace whatever obstructed image data that it can based on the size of the load 1003 and the relative position of the various cameras. Accordingly, in some such implementations, the entire load 1003 may appear transparent in the output image in some situations while, in other situations, part of the load 1003 may still appear visible in the output image.

Finally, in some implementations, the electronic controller 131 may be configured to use perspective mapping and image data overlay to "remove" or to render at least partially transparent additional components of the pickup truck other than the tailgate 105 and/or the load 1003. For example, as discussed above and as illustrated in the example of FIGS. 11A and 11B, the image data captured by the cabin camera 109 is partially obstructed by the sidewalls 803 of and the bottom surface 801 of the bed of the pickup truck. However, in some implementations, the side mirror cameras 135, 605 may be positioned and configured to capture image data of the same areas that are obstructed by the sidewalls 803 in the image data captured by the cabin camera 109. Accordingly, in some implementations, the electronic controller 131 may be configured to apply perspective mapping to the image data captured by the side mirror cameras 135, 605 and to overlay the perspective mapped image data onto the image data captured by the cabin camera 109 to replace the portion of the image data that is obstructed by the sidewalls 802 so that the sidewalls 802 appear at least partially transparent in the output image.

Figure 11A:
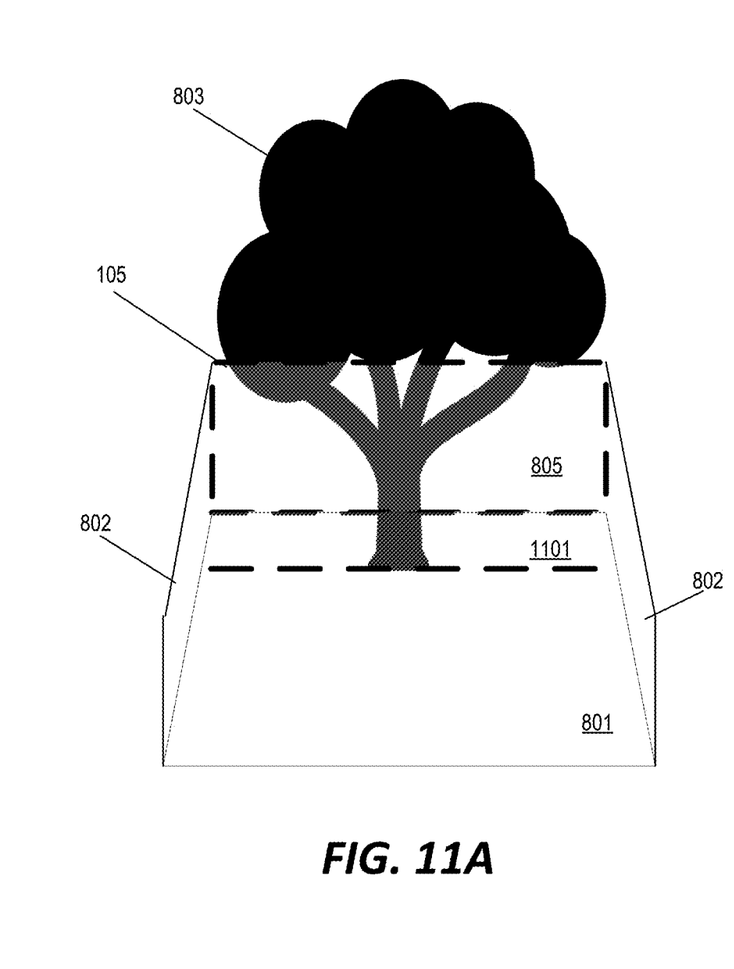
FIGS. 11A and 11B are a fourth example of image data captured by the rear-facing cabin-mounted camera and the output image displayed by the camera system when the tailgate is in the open position.
Figure 11B:
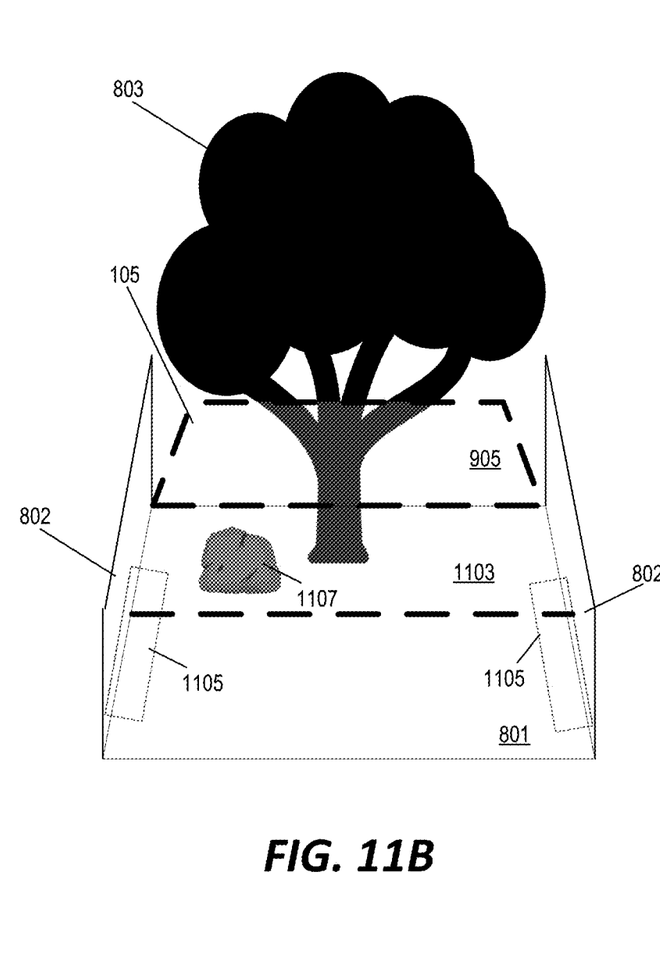

Similarly, in some implementations, the field of view of the tailgate camera 103 extends to include areas that are obstructed by the bottom surface 801 of the bed in the image data captured by the cabin camera 109 even when the tailgate 105 is in the closed/"up" position. And, when the tailgate 105 is moved to the open/"down" position, even more of the area obstructed by the bottom surface 801 of the bed in the image data captured by the cabin camera 109 is included in the field of view of the tailgate camera 103. Accordingly, in some implementations, the electronic controller 131 may be configured to determine the position of the the tailgate 105 and, based on the determined position of the tailgate, determine which portion of the bottom surface 801 of the bed in the image data captured by the cabin camera 109 can be replaced with perspective mapped image data from the tailgate camera 103.

As shown in the example of FIG. 11A, when the tailgate 105 is in the closed/"up" position, the electronic controller 131 is configured to replace the image data in area 805 of the image data captured by the cabin camera 109 with perspective mapped image data from the tailgate camera 103 and to also replace the image data in area 1101 of the image data captured by the cabin camera 109 with additional perspective mapped image data from the tailgate camera 103 so that the tailgate 105 and part of the bottom surface 801 of the bed appear transparent (or partially transparent) in the output image. Similarly, as shown in the example of FIG. 11B, when the tailgate 105 is in the open/"down" position, the electronic controller 131 is again configured to replace the image data in area 905 of the image data captured by the cabin camera 109 with perspective mapped image data from the tailgate camera 103 and to also replace image data in area 1103 of the image data captured by the cabin camera 109 with additional perspective mapped image data from the tailgate camera 103 so that the tailgate 105 and part of the bottom surface 801 of the bed appear transparent (or partially transparent) in the output image.

As discussed above, the field of view of the tailgate camera 103 is altered when the position of the tailgate 105 is changed and the field of view of the tailgate camera 103 includes a greater portion of the area obstructed by the bottom surface 801 of the bed in the image data captured by the cabin camera 109 when the tailgate 105 is in the open/"down" position. Accordingly, in some implementations, the electronic controller 131 may be configured to adjust the portions of the obstructed image data that are rendered transparent (or partially transparent) in the output image based on the current position of the tailgate 105. For example, as illustrated in FIGS. 11A and 11B, the size of the area 1103 of the bottom surface 801 that is rendered transparent in the output image when the tailgate 105 is in the open/"down" position (as shown in FIG. 11B) is greater than the size of the area 1101 of the bottom surface 801 that is rendered transparent in the output image when the tailgate 105 is in the closed/"up" position (as shown in FIG. 11A). As a result, objects may be visible in the output image generated when the tailgate 105 is in the open/"down" position that might not be visible in the output image generated when the tailgate 105 is in the closed/"up" position. For example, in FIG. 11A, the rear wheels 1105 of the pickup truck and a rock 1107 are visible in the output image when the tailgate 105 is in the open/"down" position, but are not visible in the output image when the tailgate 105 is in the closed/"up" position.

Thus, the invention provides, among other things, a camera system including a plurality of cameras mounted on a vehicle and configured to fuse image data captured from the different cameras to generate & display an output image in which portions of the vehicle and/or loads carried by the vehicle are rendered transparent or partially transparent. Various features and advantages of the invention are set forth in the following claims.

What is claimed is:

1. A camera system for a vehicle, the camera system comprising:
   a first camera mounted on the vehicle, wherein a field of view of the first camera is at least partially obstructed by a tailgate of the vehicle;
   a second camera mounted on the vehicle, wherein a field of view of the second camera includes an unobstructed view of an imaging area that is obstructed by the tailgate of the vehicle in field of view of the first camera;
   a tailgate position sensor configured to output a signal indicative of a current position of the tailgate of the vehicle;
   a display screen; and
   an electronic controller configured to determine a current position of the tailgate based on the output received from the tailgate position sensor, determine a size and a position of a portion of the field of view of the first camera that is obstructed by the tailgate based on the determined current position of the tailgate, generate an output image by replacing obstructed image data in an image captured by the first camera with unobstructed image data from an image captured by the second camera, wherein the obstructed image data in the image captured by the first camera corresponds to the determined portion of the field of view of the first camera that is obstructed by the tailgate, and display the output image to a driver of the vehicle on the display screen, wherein the electronic controller is configured to determine the size and the position of the portion of the field of view of the first camera that is obstructed by the tailgate by determining that a first predefined portion of the field of view of the first camera is obstructed in response to determining that the tailgate is in a closed position, and determining that a second predefined portion of the field of view of the first camera is obstructed in response to determining that the tailgate is in an open position.

2. The camera system of claim 1, wherein the first camera includes a cabin camera mounted on a cabin of a pickup truck with a generally rearward-facing field of view, and wherein the second camera includes a tailgate camera mounted on the tailgate such that the field of view of the tailgate camera is changed when the current position of the tailgate is altered.

3. The camera system of claim 1, wherein the second camera includes a tailgate camera mounted on the tailgate, wherein the tailgate camera has a first field of view when the tailgate is in a closed position and the tailgate camera has a second field of view when the tailgate is in an open position, and wherein the electronic controller is configured to generate the output image by replacing obstructed image data corresponding to the first predefined portion of the field of view of the first camera with unobstructed image data corresponding to the first field of view of the tailgate camera in response to determining that the tailgate is in the closed position, and replacing obstructed image data corresponding to the second predefined portion of the field of view of the first camera with unobstructed image data corresponding to the second field of view of the tailgate camera in response to determining that the tailgate is in the open position.

4. The camera system of claim 1, wherein the electronic controller is further configured to apply perspective mapping to at least part of the image data captured by the second camera to match a perspective of the first camera, and wherein the electronic controller is configured to replace the image data that is obstructed by the tailgate in the image captured by the first camera by replacing the image data that is obstructed by the tailgate in the image captured by the first camera with the perspective-mapped image data from the second camera.

5. The camera system of claim 1, wherein the electronic controller is configured to generate the output image by generating an output image in which the tailgate appears at least partially transparent.

6. The camera system of claim 1, wherein the electronic controller is further configured to detect a load carried in a cargo area of the vehicle, wherein the cargo area of the vehicle is at least partially within the field of view of the first camera, and wherein the electronic controller is configured to generate the output image by further replacing additional image data in the image captured by the first camera that is obstructed by a load carried by the vehicle with additional image data captured by the second camera in response to detecting the load carried in the cargo area of the vehicle.

7. The camera system of claim 6, wherein the electronic controller is configured to generate the output image by causing the load carried in the cargo area of the vehicle to appear at least partially transparent in the output image.

8. The camera system of claim 1, wherein the second camera includes a tailgate camera mounted on the tailgate, wherein the tailgate camera has a first field of view when the tailgate is in a closed position, the first field of view including a first portion of the field of view of the first camera that is obstructed by a cargo bed of the vehicle when the tailgate is in the closed position, wherein the tailgate camera has a second field of view when the tailgate is in an open position, the second field of view including a second portion of the field of view of the first camera that is obstructed by the cargo bed of the vehicle when the tailgate is in the open position, the second portion of the field of view of the first camera being larger than the first portion of the field of view of the first camera, wherein the electronic controller is configured to generate the output image by replacing image data corresponding to the first portion of the field of view of the first camera that is obstructed by the cargo bed of the vehicle in the image captured by the first camera with additional image data captured by the second camera in response to detecting that the tailgate is in the closed position, and replacing image data corresponding to the second portion of the field of view of the first camera that is obstructed by the cargo bed of the vehicle in the image captured by the first camera with the additional image data captured by the second camera in response to detecting that the tailgate is in the open position.

9. The camera system of claim 8, wherein the electronic controller is configured to generate the output image by causing the cargo bed of the vehicle to appear at least partially transparent in the output image, wherein the at least partially transparent portion of the cargo bed in the output image is a larger portion of the cargo bed when the tailgate is in the open position than when the tailgate is in the closed position.

10. A method of removing obstructions from an image captured by a vehicle camera system, the method comprising:

determining a current position of a tailgate of the vehicle based on an output received from a tailgate position sensor;

determining a size and a position of a portion of a field of view of a first camera that is obstructed by the tailgate based on the determined current position of the tailgate;

generating an output image by replacing obstructed image data in an image captured by the first camera with unobstructed image data from an image captured by a second camera, wherein the second camera is mounted on the vehicle with a field of view that includes an unobstructed view of an imaging area that is obstructed by the tailgate of the vehicle in the field of view of the first camera, wherein the obstructed image data in the image captured by the first camera corresponds to the determined portion of the field of view of the first camera that is obstructed by the tailgate, and displaying the output image to a driver of the vehicle on a display screen, wherein determining the size and the position of the portion of the field of view of the first camera that is obstructed by the tailgate includes determining that a first predefined portion of the field of view of the first camera is obstructed in response to determining that the tailgate is in a closed position, and determining that a second predefined portion of the field of view of the first camera is obstructed in response to determining that the tailgate is in an open position.

11. The method of claim 10, further comprising:

capturing the image captured by the first camera by capturing a first image by a cabin camera mounted on a cabin of a pickup truck with a generally rearward-facing field of view, wherein the first camera includes a cabin camera mounted on a cabin of a pickup truck with a generally rearward-facing field of view; and capturing the image captured by the second camera by capturing a second image by a tailgate camera mounted on the tailgate such that the field of view of the tailgate camera is changed when the current position of the tailgate is altered.

12. The method of claim 10, wherein generating the output image includes replacing obstructed image data corresponding to the first predefined portion of the field of view of the first camera with unobstructed image data corresponding to a first field of view of the second camera in response to determining that the tailgate is in the closed position, wherein the first field of view of the second camera corresponds to a field of view of a tailgate camera when the tailgate is in the closed position, and replacing obstructed image data corresponding to the second predefined portion of the field of view of the first camera with unobstructed image data corresponding to a second field of view of the second camera in response to determining that the tailgate is in the open position, wherein the second field of view of the second camera corresponds to a field of view of the tailgate camera when the tailgate is in the open position.

13. The method of claim 10, further comprising applying perspective mapping to at least part of the image data captured by the second camera to match a perspective of the first camera, and wherein replacing the image data that is obstructed by the tailgate in the image captured by the first camera includes replacing the image data that is obstructed by the tailgate in the image captured by the first camera with the perspective-mapped image data from the second camera.

14. The method of claim 10, wherein generating the output image includes generating an output image in which the tailgate appears at least partially transparent.

15. The method of claim 10, further comprising detecting a load carried in a cargo area of the vehicle, wherein the cargo area of the vehicle is at least partially within the field of view of the first camera, and wherein generating the output image includes further replacing additional image data in the image captured by the first camera that is obstructed by a load carried in the cargo area of the vehicle with additional image data captured by the second camera in response to detecting the load carried in the cargo area of the vehicle.

16. The method of claim 15, wherein generating the output image includes causing the load carried in the cargo area of the vehicle to appear at least partially transparent in the output image.

17. A method of method of removing obstructions from an image captured by a vehicle camera system, the method comprising:

determining a current position of a tailgate of the vehicle based on an output received from a tailgate position sensor;

determining a size and a position of a portion of a field of view of a first camera that is obstructed by the tailgate based on the determined current position of the tailgate;

generating an output image by replacing obstructed image data in an image captured by the first camera with unobstructed image data from an image captured by a second camera, wherein the second camera is mounted on the vehicle with a field of view that includes an unobstructed view of an imaging area that is obstructed by the tailgate of the vehicle in the field of view of the first camera, wherein the obstructed image data in the image captured by the first camera corresponds to the determined portion of the field of view of the first camera that is obstructed by the tailgate, and displaying the output image to a driver of the vehicle on a display screen, wherein generating the output image includes replacing image data corresponding to a first portion of the field of view of the first camera that is obstructed by a cargo bed of the vehicle in the image captured by the first camera with additional image data captured by the second camera in response to detecting that the tailgate is in a closed position, wherein the second camera includes a tailgate camera mounted on the tailgate that has the first field of view when the tailgate is in the closed position, the first field of view of the tailgate camera including a first portion of the field of view of the first camera that is obstructed by the cargo bed of the vehicle when the tailgate is in the closed position, and replacing image data corresponding to a second portion of the field of view of the first camera that is obstructed by the cargo bed of the vehicle in the image captured by the first camera with the additional image data captured by the second camera in response to detecting that the tailgate is in an open position, therein the second camera includes the tailgate camera that has the second field of view when the tailgate is in the open position, the second field of view of the tailgate camera including a second portion of the field of view of the first camera that is obstructed by the cargo bed of the vehicle when the tailgate is in the open position, the second portion of the field of view of the first camera being larger than the first portion of the field of view of the first camera.

18. The method of claim 17, wherein generating the output image includes causing the cargo bed of the vehicle to appear at least partially transparent in the output image, wherein the at least partially transparent portion of the cargo bed in the output image is a larger portion of the cargo bed when the tailgate is in the open position than when the tailgate is in the closed position.

* * * * *